Dec. 29, 1964

F. A. DAIGLER 3,163,491

STYLUS

Filed Aug. 8, 1961

INVENTOR.
FRANKLIN A. DAIGLER
BY
Bean, Brooks, Buckley + Bean
ATTORNEYS

United States Patent Office 3,163,491

Patented Dec. 29, 1964

3,163,491
STYLUS

Franklin A. Daigler, Lockport, N.Y., assignor, by mesne assignments, to Esterline-Angus Instrument Company, Inc., Indianapolis, Ind., a corporation of Delaware Filed Aug. 8, 1961, Ser. No. 130,178
1 Claim. (Cl. 346—140)

This invention relates to a stylus mechanism and pertains more particularly to a writing device adapted for use in conjunction with recording mechanism.

Of primary concern is connection with the present invention is the provision of a stylus mechanism characterized by its peculiarity of construction wherein the same not only possesses a low moment of inertia but also possesses a controlled degree of rigidity so that the stylus mechanism will engage the writing surface at the required and desired angle to effect most efficiently the writing operation.

More particularly, the present invention envisages a stylus having an elongate body provided with the intermediate and major portion thereof of relatively rigid and nonflexible form and having at its attaching end means for providing the requisite degree of elasticity to the stylus whereby the point of flexure thereof is controlled for efficient engagement of the free end of the stylus with the writing material.

Another object of this invention is to provide a stylus as aforesaid wherein the main body portion is of generally channel shape configuration tapering at its free end to a dimension sufficient to straddle and embraceably secure a circular rod like element which forms the actual writing portion of the stylus, the over-all effect being to achieve an economy of construction while at the same time achieving an efficient writing operation. To this end, it will be appreciated that a circular cross section writing component will effect substantially a line or point contact with material engaged thereby.

A further object of this invention results in the provision of an improved form of stylus as aforesaid wherein the main body portion thereof is of channel-like configuration and cross section having attached at one end the writing element and having at its opposite end a flexible member joining the same to means for detachably securing the stylus to an associated pen motor.

The foregoing and other objects, advantages and characterizing features of my invention will become clearly apparent from the ensuing detailed description of one, illustrative embodiment thereof, taken in conjunction with the accompanying drawings illustrating the same wherein like reference numerals denote like parts in each view, and wherein.

Figures 2, 3, 4:
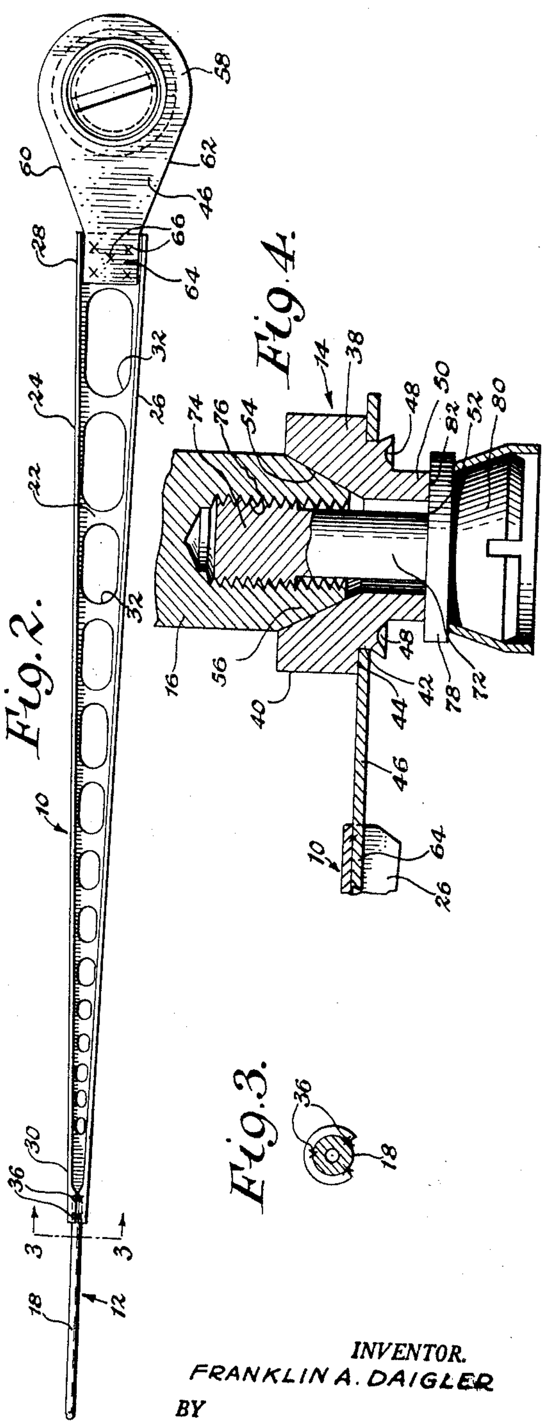
FIG. 2 is a bottom plan view of the assembly shown in FIG. 1.

FIG. 3 is an enlarged sectional view taken substantially along the plane of section line 3—3 in FIG. 2 and showing the means whereby the writing end of the stylus is attached to the main body portion thereof; and FIG. 4 is an enlarged vertical sectional taken through the attaching end of the stylus and showing the same in operative association with a pen motor shaft, further illustrating specific details of construction of the stylus assembly.

Figure 1:
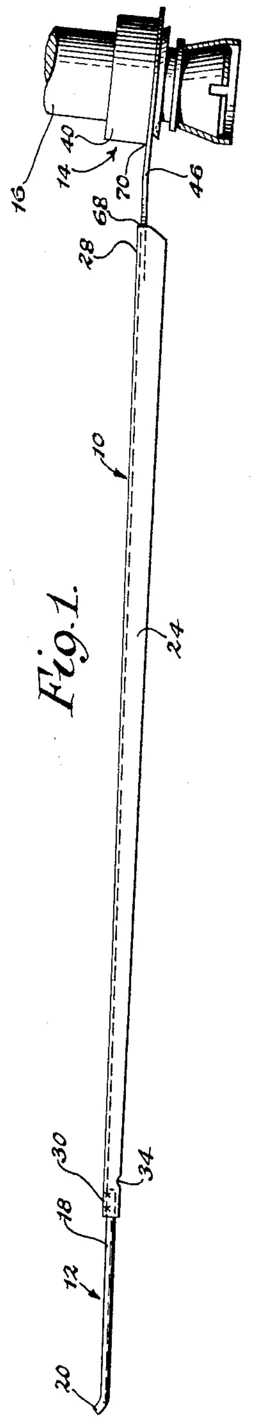
FIG. 1 is a side elevational view of a stylus constructed in accordance with the present invention and showing the same attached to a pen motor shaft.

Referring at this time more particularly to FIG. 1, the reference character 10 designates in general the main body portion of the stylus shown therein whereas the reference character 12 indicates in general the writing end of the stylus while reference character 14 indicates in general the end of the stylus which is to be attached to an associated pen motor. In FIG. 1, a pen motor shaft is indicated by the reference character 16 and it is to be appreciated that motion of the stylus is effected about a vertical axis of the shaft 16 so as to cause the same to sweep into and out of a paper as shown in FIG. 1.

The free or writing end 12 of the stylus will be seen to consist of an elongate rod like element 18 of circular cross section and preferably provided with an upturned tip 20, such tip 20 being for the purpose of assuring that the stylus does not contact the writing paper at this point.

The main body portion 10 of the stylus will be seen to be of channel shape in cross section and includes, as is shown in FIG. 2, a web portion 22 and opposite depending flange portions 24 and 26. It will be appreciated that the portion 10 of the stylus tapers from the base or attaching end 28 thereof towards the opposite or free end 30 thereof and is provided throughout with lightening holes 32 which extend into close adjacency to the free end portion 30 thereof terminating short of the end to which the element 12 is attached. It is also to be noted that the flanges 24 and 26 taper from the base end 28 to the free end 30 of the main body portion 10 and that both are notched as at 34 adjacent their free extremities. In this fashion, the construction as is shown in FIG. 3 is permitted wherein it will be seen that the web portion 32 and the opposite flanges 24 and 26 are embracingly engaged around the rod element 18 and spot welded thereto as indicated at the points 36 in this figure. Thus, it will be appreciated that the main body portion 10 is dimensioned, at adjacent the free end portion 30 thereof so as to achieve substantially the relationship to the rod element 18 as is shown in FIG. 3. That is to say, it is desired that the web and flange elements extend a major portion around the circumference of the rod but terminate short of meeting therearound so that it is assured that a good gripping action on the rod 18 is achieved as well as ample area for effecting suitable spot welding 36 as is shown.

Referring now to FIG. 4, wherein the attaching end of the stylus is shown, it will be seen that the same is formed by an adapter 38 having an enlarged cylindrical portion 40 provided with a step portion 42 presenting an annular bearing surface 44 receiving the flex plate element 46. It is to be noted that the step portion 42 is deformed as at 48 after the parts 40 and 46 have been assembled to effect a rigid interconnection therebetween particularly as is achieved by the presence of the annular bearing surface 44. The adapter 38 is provided with a further reduced cylindrical portion 50 permitting of the aforementioned deformation as at 48 to achieve the interconnection between the elements 40 and 46 and the adapter as a whole is provided with an axial bore 52 and a tapered counterbore 54 in the upper portion 40 thereof, the latter of which is adapted to receive the tapered end portion 56 of the pen motor shaft 16.

The plate 46, as can be seen best in FIG. 2, is provided with an enlarged end portion 58 which contains the opening for receiving the step portion 42 of the adapter and tapers downwardly therefrom along the opposite sides 60 and 62 to a rectangular end portion 64 which underlies the base end portion 28 of the main body portion 10 of the stylus.

The end portion 64 is spot welded as at 66 over an appreciable area thereof to the web of the intermediate portion 10 so that, in effect, no flexure is achieved at this point. Rather, flexure of the entire stylus assembly is achieved substantially only within an area between the juncture of the plate 46 and the portion 10 as indicated by reference character 68 in FIG. 1 and the juncture between the flexure plate 46 and the outer surface of the enlarged portion 40 of the adapter, as indicated by the reference character 70 in FIG. 1. Thus, by accurately controlling the difference between the two points 68 and 70 and controlling the dimensional characteristics and thickness of the flexure plate 46, flexural characteristics of the entire stylus can be controlled accurately thereby. Thus, when the stylus is operatively engaged with the writing material, the rod portion 18 thereof will engage the writing material at the proper angle end relationship in counter distinction to an assembly of the type wherein the entire stylus body throughout its length can bow under flexural stress. At the same time, the stylus construction as aforesaid possesses sufficient lateral stability to prevent any whipping or lagging of the motion of the stylus behind the motion imparted thereto by the pen motor shaft 16.

Attachment of the stylus assembly to the pen motor shaft 16 can be achieved by any suitable means such as the screw fitted fastener 72 shown in FIG. 4. This member 72 is provided with a threaded end portion 74 engaged within the threaded bore 76 of the pen motor shaft 16 and a suitable bearing washer 78 is interposed between the head 80 of the screwthread member and the bearing surface 82 of the adapter 38 so as to rigidly interconnect the adapter to the pen motor shaft 16. At the same time, it will be appreciated that the dimension of the bore 52 is sufficiently large as to permit free passage of the threaded portion 74 of the screwthread fastener 72 therethrough.

Whereas only one specific example of the invention has been described hereinabove it will be understood that various changes may be made therein without departing from the spirit of the invention or the scope of the appended claim.

I claim:

A stylus of the character described, comprising an adapter for securement to a pen motor shaft, said adapter having an enlarged upper end and a stepped portion of reduced diameter immediately thereadjacent providing a downwardly facing bearing annulus, a flexure plate having an aperture receiving said stepped portion and contacting said bearing annulus, said stepped portion being deformed to forcibly maintain said flexure plate in contact with said bearing annulus and thus rigidly join the adapter and flexure plate, said flexure plate having a portion projecting radially from the adapter, a rigid channel member joined to said portion of the flexure plate in spaced relation to said adapter, and a writing rod fixed to the free end of said channel member.

References Cited in the file of this patent

UNITED STATES PATENTS

| | | |
|---|---|---|
| 2,262,958 | Offner | Nov. 18, 1941 |
| 2,704,937 | Stokes | Mar. 29, 1955 |
| 2,746,835 | Grass | May 22, 1956 |
| 2,820,625 | Davis | Jan. 21, 1958 |
| 2,911,278 | Haigler | Nov. 3, 1959 |
| 2,947,593 | Davey | Aug. 2, 1960 |
| 2,952,501 | Roper et al. | Sept. 13, 1960 |